United States Patent
Olson et al.

(10) Patent No.: US 6,775,299 B1
(45) Date of Patent: Aug. 10, 2004

(54) COPPER BASED INTERFACE SYSTEM AND DATA FRAME FORMAT

(75) Inventors: Gary Joseph Olson, Flower Mound, TX (US); Lawrence Marion Hoskins, Fort Worth, TX (US); Michael Chis Lamp, II, Irving, TX (US)

(73) Assignee: Advanced Fibre Access Corporation, Petaluma, CA (US)

( * ) Notice: Subject to any disclaimer, the term of this patent is extended or adjusted under 35 U.S.C. 154(b) by 622 days.

(21) Appl. No.: 09/684,757

(22) Filed: Oct. 6, 2000

(51) Int. Cl.[7] .................................................. H04J 3/16
(52) U.S. Cl. ........................................................ 370/476
(58) Field of Search ................................ 379/334, 322, 379/323, 324, 413, 413.01, 93.01; 370/352, 355, 442, 465, 466, 476, 480, 485

(56) References Cited

U.S. PATENT DOCUMENTS

| | | | | |
|---|---|---|---|---|
| 5,148,144 A | * | 9/1992 | Sutterlin et al. | 340/310.01 |
| 5,903,567 A | * | 5/1999 | Alger-Meunier | 370/468 |
| 5,909,445 A | * | 6/1999 | Schneider | 370/468 |
| 6,208,664 B1 | * | 3/2001 | Plummer et al. | 370/480 |
| 6,282,204 B1 | | 8/2001 | Balatoni et al. | |
| 6,353,609 B1 | * | 3/2002 | Ethridge et al. | 370/352 |
| 6,385,253 B1 | | 5/2002 | Swisher | |
| 6,580,254 B2 | | 6/2003 | Schofield | |
| 2001/0040899 A1 | * | 11/2001 | Carter et al. | 370/477 |
| 2002/0106076 A1 | | 8/2002 | Norrell et al. | |

OTHER PUBLICATIONS

Pollakowski, Martin. "The Future of XDSL and IDSN: Competition, Coexistence, or Integration". BAC Paper. Sep. 10, 1999. pp. 1–5.*

* cited by examiner

Primary Examiner—Chi Pham
Assistant Examiner—Derrick W Ferris
(74) Attorney, Agent, or Firm—Jones Day

(57) ABSTRACT

A Bidirectional telephone communication system for supporting a multiplicity of subscriber lines at a downstream distribution terminal using only two of a multiplicity of pre-existing transmission line pairs connected between an upstream distribution terminal and the downstream distribution terminal. Standard PCM data packets are mapped into and disguised as standard European HDSL formatted data.

6 Claims, 6 Drawing Sheets

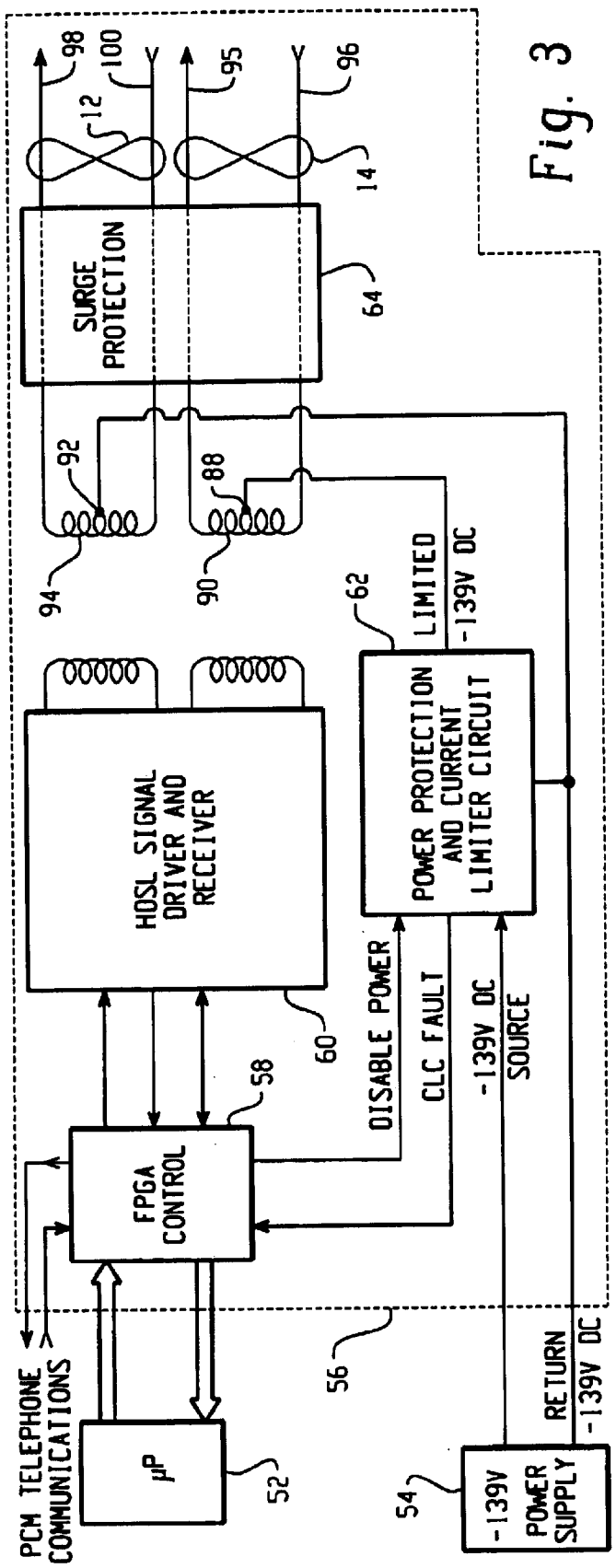
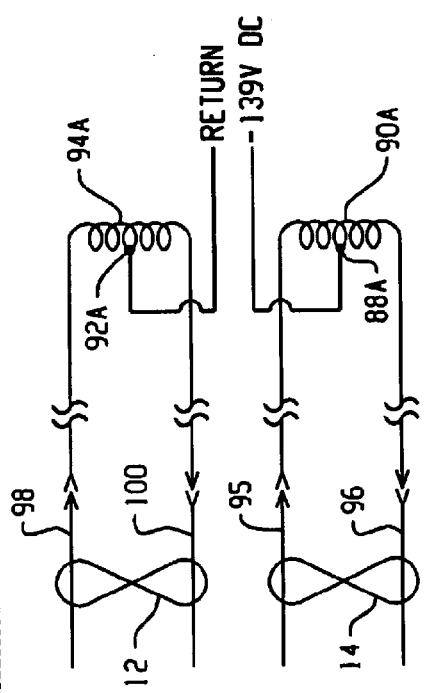
Fig. 3
Fig. 3A

COPPER BASED INTERFACE SYSTEM AND DATA FRAME FORMAT

BACKGROUND OF THE INVENTION

1. Field of the Invention

The present invention relates to telephone systems and more particularly to methods and apparatus for upgrading an existing tip and ring prior art telephone system which uses a pair of copper conductors for each bidirectional connection between two distribution terminals to a system which requires only two pairs of existing copper (or other metal) conductors for carrying a plurality (such as twenty-four) bidirectional communications between the two distribution terminals. The invention also relates to such methods and apparatus for upgrading a telephone system which, after being upgraded according to the teachings of this invention, is compatible for still further and future upgrades.

2. Description of Related Art

Over the last twenty years, the demands for "telephone"-type communications have increased at exponential rates. Telephone-type communications, or "telephony," is no longer simply applicable to telephone voice communications. In fact, the demands on the infrastructure and existing telephone systems from other types of telephony such as faxes, computer modems, etc. and other broadband uses now exceed voice communications in most locations.

Consequently, telephone systems in these high-density areas now use many different high speed, broadband transmission techniques, including light transmission through optical fibers. Yet, even though there are areas of communications or physical locations demanding this very high-density type of service, there are likely to be other areas or communications or physical locations immediately adjacent where the demands on telephone service has increased only slightly from the demands of twenty years ago. Therefore, methods and equipment must be provided which interface various levels of service demands.

It is therefore not unusual to require different upgrade levels of a telephone system depending upon these highly varying needs. In addition, because new and different services which require high-speed and broad-band telephone communications seem to be hitting the market every day, it is also desirable to provide methods and apparatus for upgrading a telephone system, which upgrade will also allow for continuous and much expanded upgrades of service in the future with minimal change to the existing infrastructure.

SUMMARY OF THE INVENTION

Therefore, it is an object of the invention to provide methods and apparatus to increase the number of communication channels carried by existing copper wire pairs.

It is yet another object of the present invention to provide methods and apparatus for efficient and cost effective upgrading to existing infrastructure copper wire communication pairs.

These and other objects can be achieved by the present invention which provides bidirectional telephone delivery circuitry and methods for supporting a multiplicity of telephone subscriber lines at a downstream distribution terminal using only two of a multiplicity of pre-existing transmission line pairs connected between an upstream distribution terminal and the downstream distribution terminal. The methods and apparatus comprise an upstream distribution terminal which may receive and transmit PCM telephone signals to and from one location. These PCM signals are transmitted to conversion circuitry which includes an HDSL driver and receiving circuit for receiving HDSL TDM data packets disguised in standard European ETSI ETR format from a downstream terminal, and for transmitting corresponding HDSL TDM signals to the downstream terminal in standard European ETSI ETR format. A pair of HDSL isolation transformers are included and, according to one embodiment, each of the pair has an upstream side coil connected to the HDSL driver and receiver circuit and each also has a downstream side coil connected to one of two conductor pairs such as a pair of copper tip and ring conductors typically used for existing voice telephone service. Each of the downstream coils of the two transformers also includes a center tap. There is included power circuitry for providing a source of regulated and current limited DC power which has a power output terminal and a return terminal. The power output terminal is connected to the center tap of one of the pair of isolation transformers, and the power return terminal is connected to the center tap of the other one of the pair of isolation transformers. Two conductor transmission line pairs are chosen from the existing two conductor transmission line pairs typically used for tip and ring voice telephone service. The two transmission line pairs will typically be selected from the existing multiplicity of infrastructure telephone transmission lines located between the upstream distribution terminal and the downstream distribution terminal. As mentioned above, one of the transmission line pairs is connected to each side of the downstream coil of one of the isolation transformers and the other one of the transmission line pairs is connected to each side of the downstream coil of the other one of the transmission line pairs. The existing infrastructure at the downstream distribution terminal will typically include a multiplicity of telephone subscriber lines connected between a plurality of user locations such as homes or businesses and the downstream distribution terminal. Thus, the downstream distribution terminal is located between the two conductor transmission line pairs and the selected multiplicity of telephone subscriber lines. The downstream distribution terminal will also include a pair of isolation transformers and an HDSL TDM driver and receiver circuit substantially similar to that in the upstream distribution terminal which connects with the HDSL TDM driver and receiver circuit located in the upstream distribution terminal through the two transmission line pairs. The DC power distribution circuit provides a DC power source in the downstream distribution terminal and includes at least a pair of output terminals and an input power terminal connected to the center tap of the isolation transformer connected across one of the transmission line pairs and an input power return terminal connected to the center tap of the other isolation transformer connected across the other one of the transmission pairs so as to receive the source of regulated and current limited DC power from the upstream distribution terminal.

The power circuitry located in the upstream distribution terminal provides the regulated and current limited DC power to the downstream distribution terminal on two transmission line pairs which also carry HDSL TDM bidirectional telephone signals. The HDSL TDM circuitry includes a pair of HDSL isolation transformers and the downstream coil of the isolation transformers each include center taps, one center tap connected to the power output terminal and the other center tap connected to the power return terminal.

BRIEF DESCRIPTION OF THE DRAWINGS

These and other features of the present invention will be more fully disclosed when taken in conjunction with the following Detailed Description of the Invention in which like numerals represent like elements and in which:

FIG. 3 is a block diagram of the system circuitry of the present invention located at an "upstream" distribution terminal;

FIG. 3A shows a pair of isolation transformers in the "downstream" distribution terminal used to receive DC regulated power at the center taps.

DETAILED DESCRIPTION OF THE INVENTION

Figure 1:
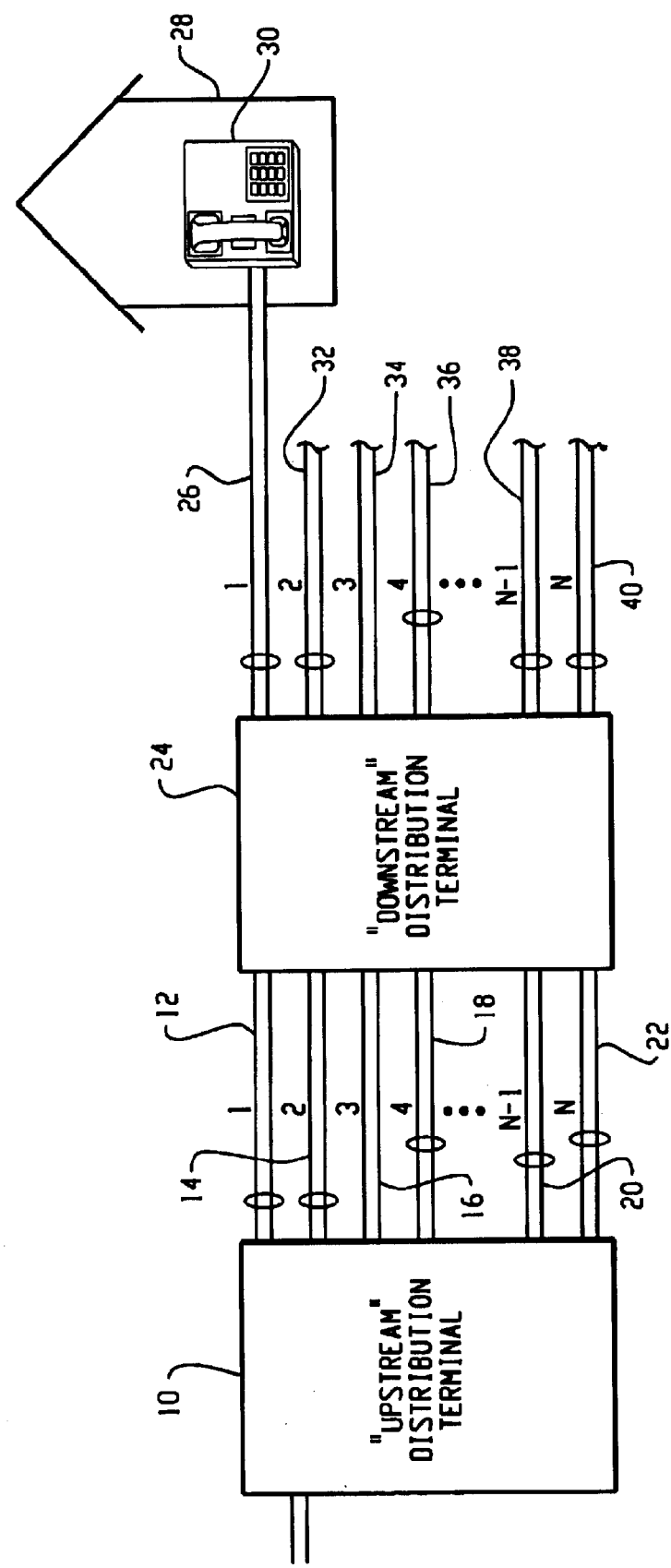
FIG. 1 is a prior art diagram of existing tip and ring telephone circuitry.

Referring now to FIG. 1, there is shown a portion of the distribution circuitry for a prior art telephone system using a pair of electrical conductors for each channel of communication. As shown in the figure, there is an "upstream" distribution terminal 10 providing a multiplicity "N" of conductor pairs 12, 14, 16, 18, 20 and 22 to a "downstream" distribution terminal 24. The multiplicity "N" of conductor pairs according to the infrastructure of a typical telephone system is equal to twenty-four. Downstream distribution terminal 24 provides a like number of "N" conductor pairs to end users or subscribers such as conductor pair 26 to a house 28 having a standard voice telephone connection 30. The term "upstream" is used herein to indicate a distribution terminal close to a control or central office and the term "downstream" is used to indicate a distribution terminal close to the end user. In this prior art system, it is seen that it was required to have at least as many conductor pairs between the "upstream" distribution terminal and the "downstream" distribution terminal as it was between the "downstream" distribution terminal 24 and each of the individual telephone services connected to the distribution terminal 24 as indicated by conductor pairs 26, 32, 34, 36, 38 and 40.

Figure 2:
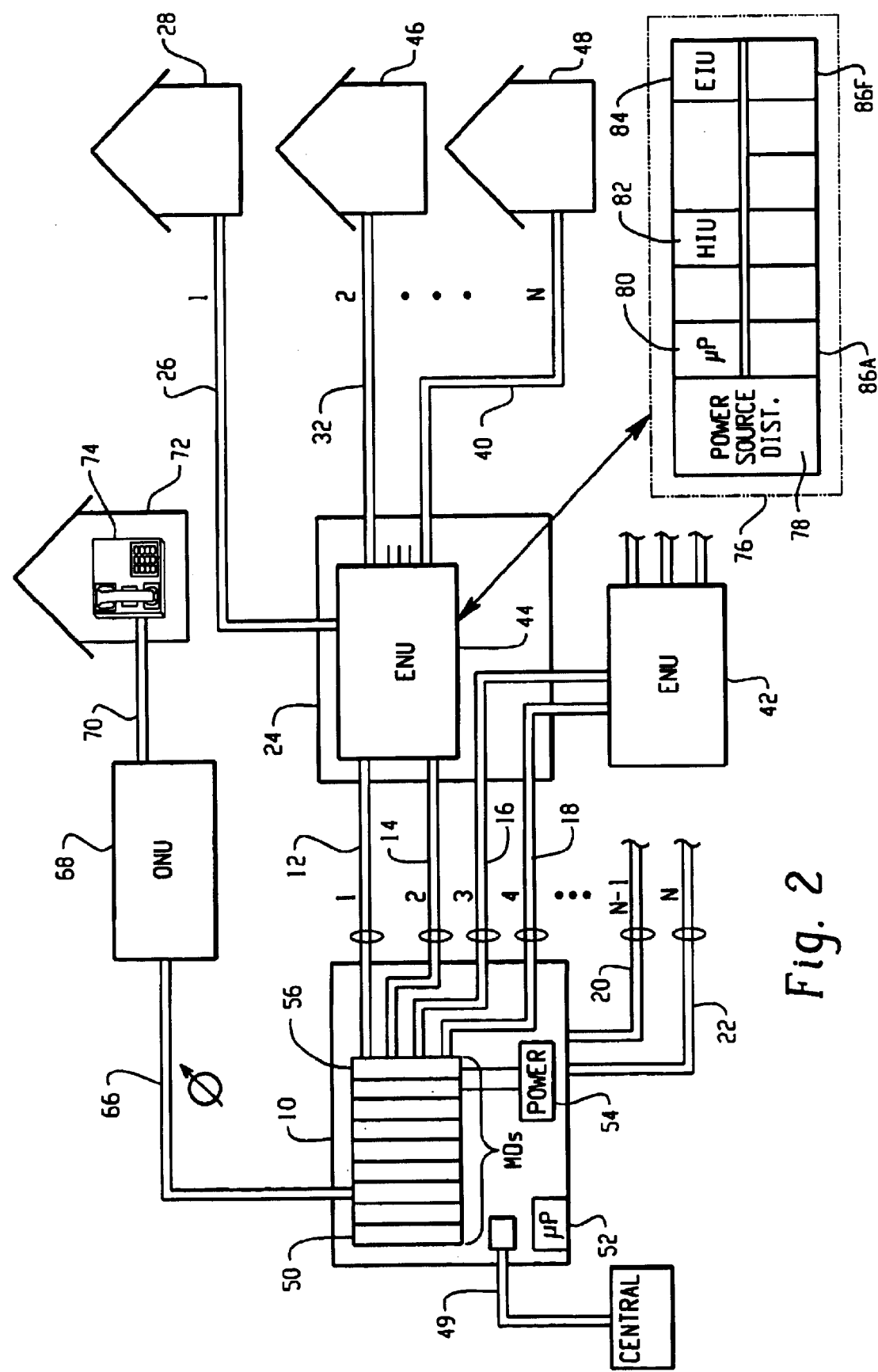
FIG. 2 shows a block diagram of the circuitry of the present invention utilizing some of the infrastructure of the prior art.

Referring now to FIG. 2, there is shown a block diagram of the telephone service of the present invention which uses some of the infrastructure of the prior art system but in a much more efficient way that allows substantial increase in the number of communication channels. For example, the upstream distribution terminal 10 may be the same outside steel cabinet as used with the prior art and which has the same number or multiplicity of conductive pairs represented by line pairs 12, 14, 16, 18, 20 and 22 which represent pairs 1 through N between the "upstream" distribution terminal 10 and the "downstream" distribution terminal 24. However, according to the present invention, it will only be necessary to use two transmission lines, such as pairs 12 and 14, to service the same number of customers connected to the local or downstream distribution terminal 24 as was serviced by distribution terminal 24 in the prior art circuitry of FIG. 1. Therefore, if, for example, there were twenty-four conductive pairs between the upstream distribution terminal 10 and the downstream or local distribution terminal 24 in the prior art, there will still be twenty-four conductive pairs between the two distribution terminals, but only two of the twenty-four pairs are necessary to provide all of the communication channels between remote or upstream distribution terminal 10 and local or downstream distribution terminal 24. Thus, the other twenty-two pairs can be used for other purposes as indicated by second ENU (Electrical Network Unit) 42 which may be at a distance from local distribution terminal 24. In addition to being connected to line pairs 12 and 14 from remote distribution terminal 10, the ENU 44 in local distribution terminal 24 is also connected to the conductive pairs 26, 32, 34, 36 and 40 to the end users such as end user 28 on line 26 and end users 46 and 48 on lines 32 and 42, respectively.

Further, as will be appreciated by those skilled in the art, the use of modern communication techniques, such as for example PCM (Pulse Code Modulation), may provide a large number of telephone communication channels to be provided to upstream terminal 10 over a single cable 49. Therefore, if the PCM communication data is to travel between terminal 10 and terminal 24 on two transmission line pairs, the format of the data must be changed.

Therefore, according to the present invention, remote distribution terminal 10 will now include new equipment such as the Matrix Distribution Shelf (MDS) 50, a microprocessor 52 and a power source 54. According to one embodiment, MDS 50 has sufficient slots to handle up to fourteen separate communication boards such as communication board 56. Also, according to the present invention, each of the communication boards can handle four separate distribution circuits of the type shown in FIG. 3. Each of the two circuits are connected to two transmission line pairs such as transmission line pairs 12 and 14. Thus, according to the present invention, the communications board 56 on the Matrix Distribution Shelf 50 can receive transmission line pairs 12 and 14 connected to ENU 44 and transmission line pairs 16 and 18 to the second ENU 42. As shown in FIG. 3, circuitry included on the communications board 56 includes a field programmable gate array 58, HDSL signal driver and receiver 60, Power Protection and Current Limiter Circuitry 62 and surge protection circuitry 64. In addition to the circuitry located on the communication board 56, as discussed above, the upstream distribution terminal itself also includes a microprocessor 52 and power supply 54 which are connected in a similar manner to the other thirteen communication boards.

Thus, the two conductor pairs 12 and 14, as will become clear hereinafter, by using the new and unique circuitry of this invention and the HDSL transmission format, are now capable of carrying all twenty-four of the communication channels that were carried by the multiplicity of twenty-four conductive pairs required by the prior art circuitry. It should be understood that references to twenty-four communication channels is for convenience only since that is the number in many existing prior art telephone systems. The number can, of course, vary from twenty-four. In addition, it is seen that another multiplicity of twenty-four prior art communication channels can also be routed through downstream distribution terminal 24 to be carried by conductive pairs 16 and 18. Furthermore, as is indicated by the optical transmission line 66, completely new and different transmission methods such as light transmission methods through optical fiber 66 can be provided from the remote distribution terminal 10 to a different local distribution terminal 68. As an example only, downstream distribution terminal 68 may be a completely optical system which receives a single optical fiber 66 carrying a large multiplicity of communication channels from the remote terminal 10 to the ONU or downstream distribution terminal 68. ONU 68 may represent a local or downstream distribution terminal for new construction, office buildings, new residential subdivisions, etc. Thus, as shown in the drawing, there is also included at least one communication channel 70 between ONU 68 and subscriber location 72 with a telephone 74. It will be appreciated that the communication channel between ONU 68 and subscriber 72 could be by means of an optical fiber or traditional communication pairs.

In addition to new equipment provided in the remote distribution cabinet 10, it will also be necessary to provide new equipment such as ENU 44 in the downstream distribution terminal or cabinet 24. As shown in the blown-up portion 76 of FIG. 2, ENU 44 will include a power supply source 78, its own microprocessor 80, an HIU (HDSL Interface Unit) 82 for receiving the HDSL formatted communication data and an EIU or Electrical Interface Unit 84 which interfaces the two communication pairs 12 and 14 between upstream terminal 10 and downstream terminal 24 with the individual communication or channel quad cards 86a through 86f. Each of the six channel cards 86a through 86f can handle up to four communication circuits and thus, the full original twenty-four circuits can receive the twenty-four different communication pairs from the original twenty-four customers. These twenty-four communication signals are then converted to an HDSL format so they can be handled by the two transmission pairs 12 and 14 connected between the upstream terminal 10 and the local or downstream terminal 24 rather than the twenty-four line pairs required by the prior art.

As will be appreciated by those skilled in the art, the addition of electronic equipment, such as that located in ENU 44 at terminal 24 which allows a significant increase in communication channels without any increase in transmission wire pairs to the cabling infrastructure, requires a stable and dependable power source. Therefore, unless each downstream terminal, such as terminal 24, is connected to a power source and includes its own regulated power supply circuitry for operating the electronic equipment, it is necessary that the stable and dependable power source be provided from the upstream terminal 10 which may be located at a significant distance from downstream terminal 24. According to the present invention, a regulated and current limiter power source is provided from the upstream distribution terminal 10 to a power distribution panel 78, which in turn is connected to microprocessor 80, HIU 82 and the six channel cards 86a through 86f. As was discussed above, regulated power is connected to the center taps 88 and 92 of the two isolation transformers 90 and 94 which transformers are connected across the two transmission line pairs 12 and 14. As shown in FIG. 3A, two isolation transformers 90A and 94A are connected across the same two transmission line pairs which extend between the "upstream" distribution terminal 10 and the "downstream" distribution terminal 24. Thus, the regulated power provided from the "upstream" terminal is accessed at the "downstream" terminal 24 by center taps 88A and 92A. This regulated power is connected to power distribution panel where it is available to the circuitry in "downstream" distribution terminal 24 as discussed above. Circuitry 62 provides a stable and dependable source of power to one or more downstream distribution terminals located at distances up to 12,000 feet, such as, for example, downstream or local distribution terminal 24.

Figure 4:
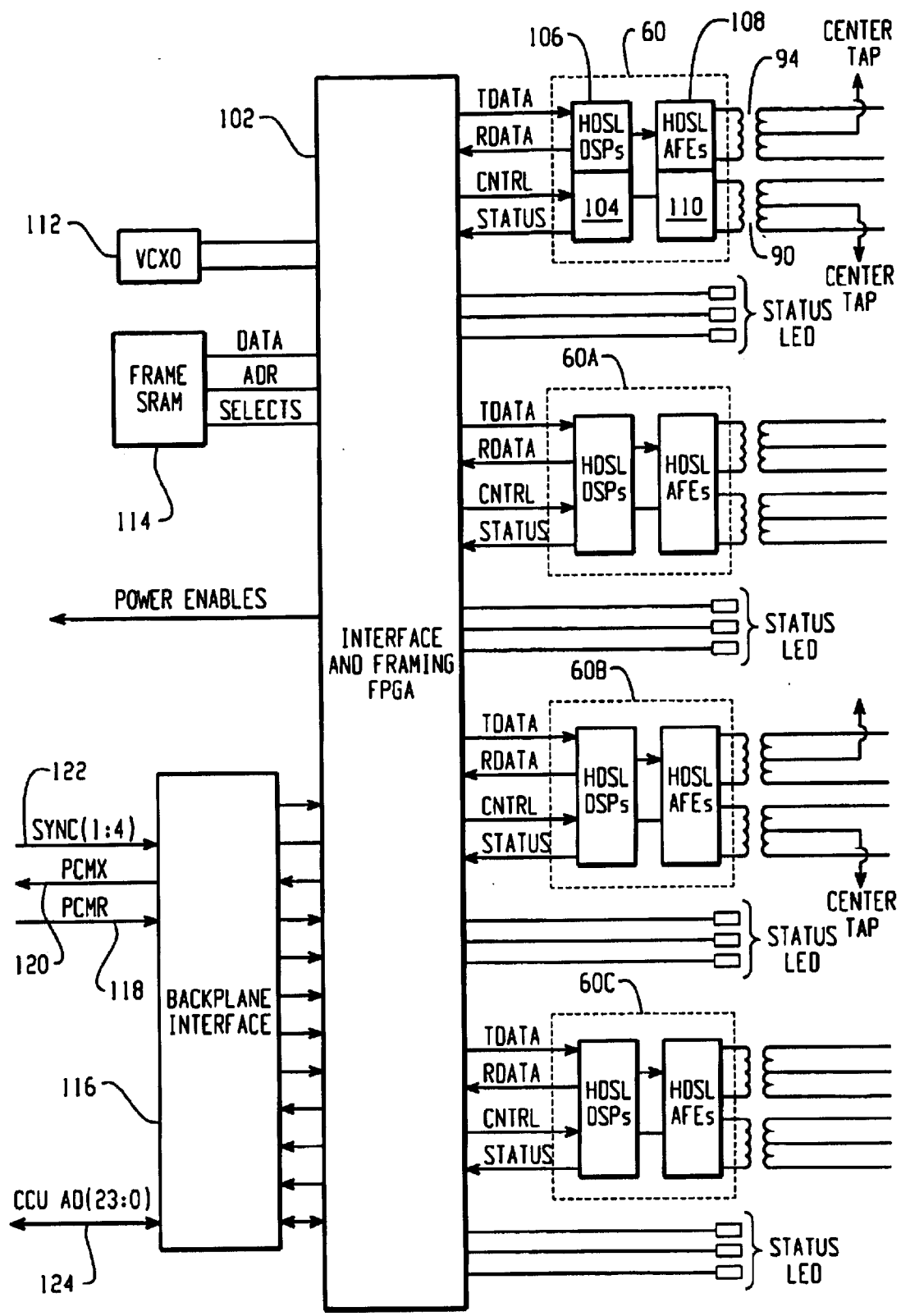
FIG. 4 is a block diagram of the HDSL signal driver and receiver circuitry shown in FIG. 3.

It will also be appreciated by those skilled in the art, that the actual HDSL TDM communication signals are also carried by the same two transmission pairs 12 and 14. Therefore, referring now to FIG. 4, there is shown a block diagram of one of the communication boards 56 of FIG. 2. There are four of the HDSL Driver and Receiver Circuits 60 of FIG. 3 on each communication board 56. As shown in FIG. 4, there is an Interface and Framing FPGA (Field Programmable Gate Array) 102 connected to a first pair of DSP's (Digital Signal Processor) 104 and 106 which are in turn connected to signal processing circuits 108 and 110, respectively. The DSP's 104 and 106, along with their corresponding signal processors 108 and 110, comprise the HDSL signal driver and receiver circuitry 60 shown in FIG. 3. Also as shown, the isolation transformers 90 and 94 discussed above, are connected to the signal processors 108 and 110, respectively, of HDSL signal driver and receiver circuitry 60. The three remaining HDSL signal driver and receiver circuits 60A, 60B and 60C, along with the corresponding pairs of isolation transformers, are identical as to components and operation to HDSL signal driver and receiver circuit 60. These HDSL signal driver and receiver circuits are also connected to Interface and Framing FPGA 102 in the same manner as circuit 60, and will not be discussed further.

Communication board 56 also includes a crystal oscillator 112 for clocking and synchronization purposes and an SRAM 114 for selecting and providing framing data and addresses to the DSP's 104 and 106. In addition, Interface and Framing FPGA 102 is also connected to a Backplane Interface 116. Backplane Interface 116 is also connected to the telephone receiving and transmitting PCM lines 118 and 120, respectively, along with various control signals including a sync signal on line 122 and addressing data represented by line 124.

Referring again briefly to FIG. 2, as discussed above, it will be appreciated by those skilled in the art, that the communication boards 56 must convert communications data received at terminal 10 on line 49 (such as, for example, a central office 126) from another location to a format suitable for transmission on two transmission line pairs. Furthermore, if it is necessary or desirable to amplify the HDSL communications signals traveling between terminals 10 and 24, it would be highly desirable to transmit the communication data between terminals 10 and 24 in a format that would allow the use of existing and commercially available repeaters and amplification equipment. To this end, it has been found that redefining the HDSL data so that it is disguised in ETSI ETR-152 (European standard) format, readily available level one EDSP repeaters, demonstration boards and line test equipment may be used. Therefore, according to this invention, EDSP's 104 and 106 receive the PCM data and, in response to firmware instructions from Interface and Framing FPGA 102, redefine the data into the basic ETSI ETR-152 data frame format represented by FIG. 5. Thus, this basic ETSI data frame format is transmitted in both directions between terminals 10 and 24 on both line pairs 12 and 14 such that each transmission line pair carries one-half the data packets moving between the two distribution terminals. Since the communication data is being transmitted over the same two transmission line pairs in both directions and at the same time, it is necessary that data traveling in one direction be separated from data traveling in the opposite direction and, as will be appreciated by those skilled in the art, one effective technique is by echo cancellation. That is, the data being transmitted at a first location is subtracted from the total data present on the line at that first location. This, of course, leaves only the data transmitted from a second or remote location and received at the first location. This received data is then amplified and processed by the DSP's and returned to standard PCM format.

Figure 5:
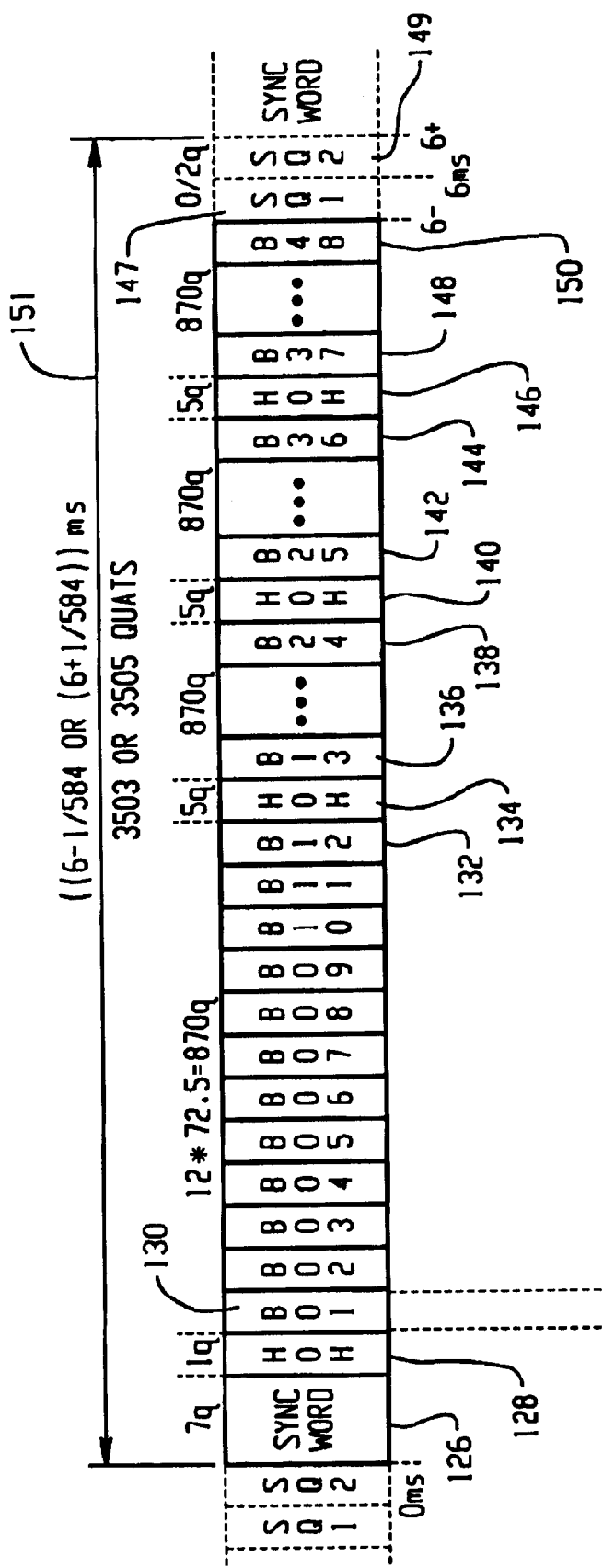
FIG. 5 shows a ETS1 ETR-152 data frame used to disguise PCM data packets according to the teachings of the present invention.
Figure 6:
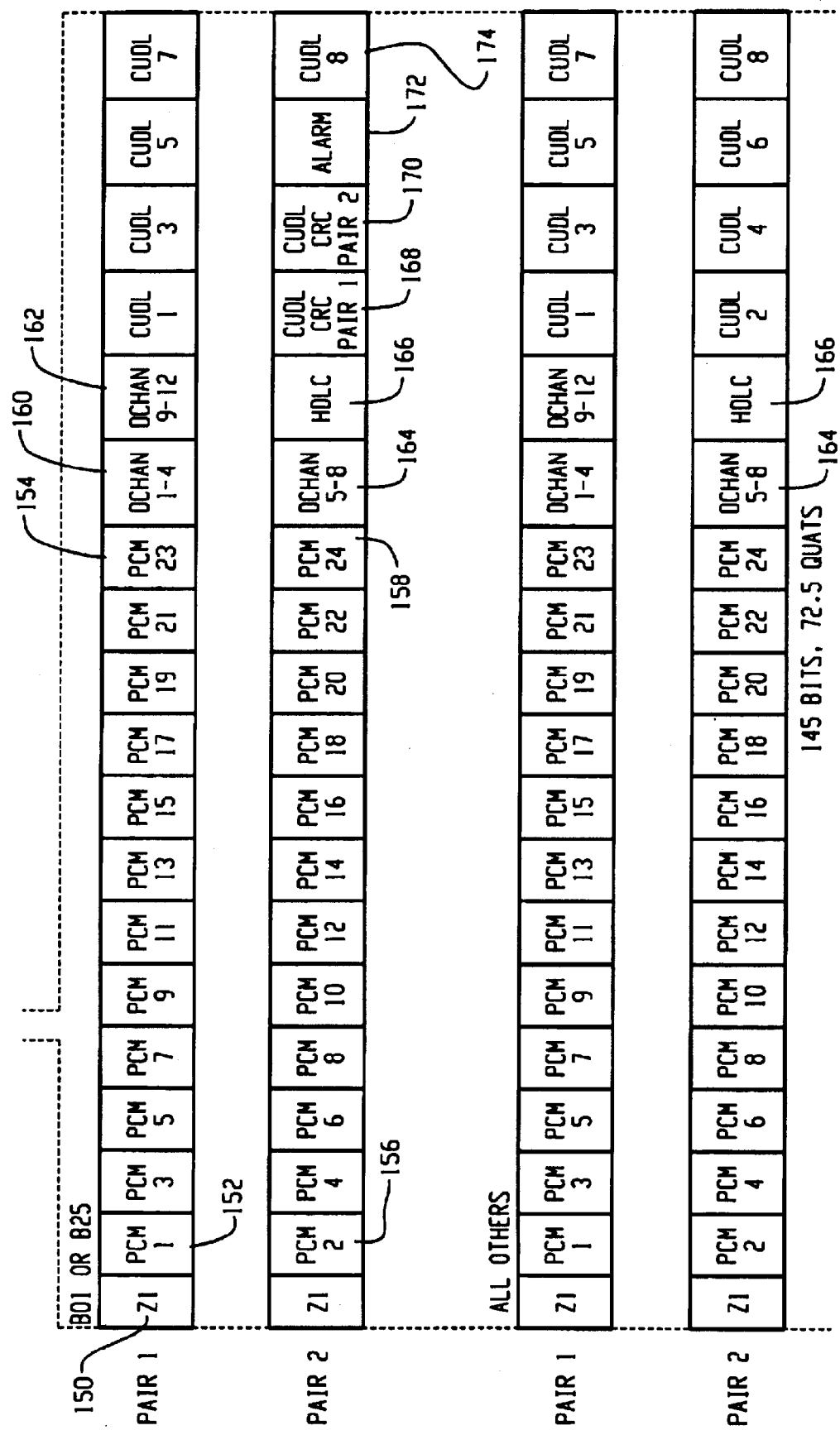
FIG. 6 shows how PCM data packets are mapped into a ETS1 data frame for transmission on two transmission line pairs according to the teachings of the present invention.

According to one embodiment and as shown in FIG. 6, transmission line pair 1 carries the "odd"-numbered PCM data packets and the other line pair carries the "even"-numbered data packets. Except for a sync data location and four locations carrying overhead information, the standards for the ETSI data frame format only define the number of locations in a data frame and the size of the location. Therefore, it is possible to disguise a number of PCM data packets as ETSI data packets. Referring again to FIG. 5, the ETSI-ETR data frame initially includes sync word location 126. Then, as will be appreciated, this sync location is followed by an HOH (HDSL overhead) location 128 which will include various bits of overhead or housekeeping information. HOH location 128 is then followed by 12 data locations such as data location B01 having reference number 130 through data location B12 having reference number 132. Data location 132 is then followed by another HOH location 134 and another 12 data location B13 having reference number 136 through data location B24 having reference number 138. Data locations up to location 138 represent one-half of the ETSI ETR-152 data frame. The second half of the data frame starts with HOH location 140 followed by data location B25 having reference number 142 through B36 having reference number 144, and the HOH location 146 followed by data locations 148–150.

In keeping with the European standard ETSI format, the data frame shown in FIG. 5 is described with respect to quats. A quat is equal to two bits. Therefore, sync word 126 is shown to be seven quats or fourteen bits. Likewise, HOH slot 128 is one quat or two bits. HOH slots 134, 140 and 146 are five quats or ten bits each. Each of the data slots B01, B02—through B48 are 72.5 quats or 145 bits each. It should also be appreciated that each of the ETSI data slots B01 through B48 each accommodate twenty-four PCM data packets plus various control and information packet slots as will be discussed below. Therefore, in the format set out in FIG. 6, the twenty-four PCM data packets each represent a slice of one of the twenty-four analog telephone or communication links in digital format. Therefore, each ETSI frame carries forty-eight consecutive slices of twenty-four different communication links. The forty-eight packets are substantially 125 microseconds each and therefore the ETSI data frame is six milliseconds (125 microseconds×48=6 milliseconds) plus or minus two "stuffing quats" 147 and 149 and as indicated by double-headed arrow 151. Stuffing quats 147 and 149 allow for timing adjustments of each frame by automatically adding, or not adding, as appropriate, the stuffing quats to slow the transmission if necessary. In any event, the two stuffing quats 147 and 149 will be added as necessary to assure two consecutive ETSI frames will be twelve milliseconds or an average of six milliseconds each.

Since, according to one embodiment, each one of the data ETSI locations 130–132, 136–138, 142–144, and 148–150, can carry a multiplicity of PCM data packets (such as twenty-four packets), it is necessary to provide additional information and housekeeping instructions in addition to the HOH data frame information carried by locations 128, 134, 140 and 148.

Therefore, referring now to FIG. 6, there is shown twenty-four PCM communication data packets mapped into each of the ETSI memory locations shown in FIG. 5. As shown, each of the ETSI locations shown in FIG. 5 are sub-divided into a total of eighteen separate locations per transmission line (twelve data and six overhead) and a ETSI overhead location "Z," carrying reference number 150. Also, the first transmission line pair, which may, for example, be line 12 as shown in FIG. 3, carries the twelve odd-numbered packets of the twenty-four total of PCM communication data packets (PCM data packet 1 indicated by reference number 152 through PCM data packet 23 indicated by reference number 154) and the second transmission line pair (such as transmission line pair 14) carries the twelve even-numbered PCM data packets—PCM 2 indicated by reference number 156 through PCM 24 indicated by reference number 158. It is also noted that instead of PCM data packets, the last four locations provide or carry selected status values or housekeeping instructions.

It should be noted that the formatting instruction available on transmission line pair one is the same for all of the 48 ETSI data locations whereas the last six slots in each ETSI location on transmission line pair 2 is different than transmission line pair 1 for ETSI locations B01 and B25 (reference numbers 130 and 142). These locations carry different information than the slots in the remaining ETSI data locations carry. For example, location 160 carries DCHAN 1–4 information and location 162 carries DCHAN 9–12 information. "DCHAN" information represents instructions and overhead in the event the transmission line pair is to carry ISDN digital data rather than carry analog POTS (Plain Ole Telephone Service) analog data. In addition to the time slots 160 and 162, it will be seen that transmission line pair 2 also includes time slot 164 which carries DCHAN 5–8 information. This is necessary since the ISDN digital data requires twice the bandwidth per channel as the PCM POTS data. Therefore, two transmission line pairs can only carry twelve ISDN communication channels and not the twenty-four communication channels that can be carried if its transmissions are for POTS service. The last four slots carry CUDL-CUDL 7 information.

However, as mentioned above, the last six slots are different for slots B01 and B25 on transmission line pair 2 than for line pair 1. For example, after the DCHAN 5–8 slot 164 and the HDLC slot 166 (which is the same for both transmission line pairs), the B02–B24 and B26–B48 slots for line pair 2 carry further CUDL information in the same manner as transmission line pair 1.

However, the ETSI time slots B01 and B25 carry different information in their last four locations, 168, 170, 172 and 174 on line pair 2 than all of the other ETSI time slots carry in the last four locations.

More specifically, the HDLC slots 166 are dedicated to carrying status and operational information between the microprocessor 52 in the MDS shelf and the microprocessor 80 in the ENU as shown in FIG. 2.

CUDL 1 through CUDL 8 overhead slots (CUDL is an acronym for Channel Unit Data Link) carry proprietary information to set up the link for each of the standard voice telephone or POTS communication links.

The CUDL CRC slots 169 and 170 which are present only in the B01 and B24 ETSI time slots provide additional CRC (Cyclic Redundancy Checks) critical information so that it is not necessary to wait for the next ETSI frame or a full six milliseconds to verify the integrity of the communication transmissions. As will be appreciated by those skilled in the art the transmission, integrity is verified by calculating a CRC value from the data stream and then comparing this calculated CRC valve of the received data stream with the CRC value previously calculated at the other end of the transmission line by the transmitting hardware. If the values are the same, the communication link is verified. Thus, the integrity of the communication line is verified at significantly shorter time periods than every six milliseconds, which is the time period of each ETSI data frame.

The corresponding structures, materials, acts and equivalents of all means or step plus function elements in the claims below are intended to include any structure, material, or act for performing the function in combination with other claimed elements as specifically claimed.

What is claimed is:

1. A bidirectional telephone delivery system for supporting a multiplicity of telephone subscriber lines at a downstream distribution terminal using only two of a multiplicity of pre-existing transmission line pairs connected between an upstream distribution terminal and said downstream distribution terminal, comprising:

two transmission line pairs extending between said upstream distribution terminal and said downstream terminal;

said upstream distribution terminal comprising;

power circuitry for generating a source of regulated and current limited DC power and having a power output terminal and a return terminal;

upstream formatting circuitry for mapping a multiplicity of PCM formatted data packets into a standard communication format different than said PCM format, for transmission on two transmission line pairs, wherein said standard format which is different than PCM format is standard European HDSL formats ETSI ETR-152 format, said mapping into said ETSI ETR-152 format comprising the providing of Cycle Redundancy Check (CRC) information in Channel Unit Data Link (CUDL) slots so that a CRC verification may occur independent of successive ETSI frames being received;

an upstream pair of isolation transformers, each of said pair having an upstream coil connected to said formatting circuitry and each having a downstream coil connected across one of said transmission line pairs, each of said downstream coils of said pair of transformers further being connected one each to said power output terminal and said return terminal of said power circuitry;

said downstream distribution terminal comprising:

DC power distribution circuitry for receiving power from said upstream power circuitry on said pair of transmission line pairs for providing a DC power source in said downstream distribution terminal; and downstream formatting circuitry for receiving said PCM data packet formatted in said different format and reformatting in standard PCM format and a downstream pair of isolation transformers, each having downstream coils connected to said downstream formatting circuitry and upstream coils connected across one of said transmission line pairs.

2. The telephone system of claim 1 wherein odd PCM data packets are carried by a first one of said two transmission line pairs and even PCM data packets are carried by a second one of said two transmission line pairs.

3. The telephone system of claim 1 wherein said system formatting circuitry comprising DSP circuitry and FPGA circuitry, said DSP circuitry responsive to said FPGA circuitry.

4. The telephone system of claim 1 wherein said upstream formatting circuitry further includes circuitry to format communication data received from said downstream distribution terminal into standard PCM format.

5. A method of providing bidirectional telephone service for a multiplicity of subscribers between an upstream distribution terminal and a downstream distribution terminal on two transmission line pairs comprising steps of:

extending two transmission line pairs between said upstream distribution terminal and said downstream distribution terminal;

generating a source of regulated and current limited DC power on a power output terminal and a return terminal at said upstream terminal;

mapping a multiplicity of PCM formatted data packets into a standard communication format different than PCM format for transmission on said two transmission line pairs, wherein said standard format which is different than PCM format is standard European HDSL format ETSI, ETR-152 format, said mapping into said ETSI ETR-152 format comprising the providing of Cycle Redundancy Check (CRC) information in Channel Unit Data Link (CUDL) slots so that a CRC verification may occur independent of successive ETSI frames being received;

isolating said upstream terminal from said two transmission line pairs by connecting a pair of isolation transformers there between;

reformatting said transmitted data PCM packets into standard PCM format; and isolating said downstream terminal from said two transmission line pairs by connecting a second pair of isolation transformed between said two transmission line pairs and said downstream terminal.

6. The method of claim 5 and further comprising the steps of transmitting odd mapped data packets on a first one of two transmission line pairs and transmitting even mapped data on a second one of said two transmission line pairs.

* * * * *